(12) United States Patent
Davison

(10) Patent No.: US 9,680,361 B2
(45) Date of Patent: Jun. 13, 2017

(54) PULLEY ELECTRIC MOTOR

(71) Applicant: Greg Matthew Davison, Elk Grove Village, IL (US)

(72) Inventor: Greg Matthew Davison, Elk Grove Village, IL (US)

(*) Notice: Subject to any disclaimer, the term of this patent is extended or adjusted under 35 U.S.C. 154(b) by 267 days.

(21) Appl. No.: 14/027,221

(22) Filed: Sep. 15, 2013

(65) Prior Publication Data

US 2015/0076971 A1    Mar. 19, 2015

(51) Int. Cl.
*H02K 21/00* (2006.01)
*H02K 25/00* (2006.01)

(52) U.S. Cl.
CPC ................... *H02K 25/00* (2013.01)

(58) Field of Classification Search
CPC ............... H02K 25/00; H02K 7/14
USPC ............. 310/152, 232, 233, 112, 113, 114
See application file for complete search history.

(56) References Cited

U.S. PATENT DOCUMENTS

| | | | | |
|---|---|---|---|---|
| 6,181,046 B1* | 1/2001 | Daikoku | ............... | H01R 39/04 310/204 |
| 2005/0035681 A1* | 2/2005 | Faltin | ............... | H02K 23/54 310/268 |
| 2006/0119215 A1* | 6/2006 | Ritz, Jr. | ............... | H02K 1/141 310/268 |
| 2007/0052314 A1* | 3/2007 | Hsu | ............... | H02K 21/24 310/179 |
| 2008/0024044 A1* | 1/2008 | Palmer | ............... | H02P 6/08 310/68 R |
| 2011/0109185 A1* | 5/2011 | Sullivan | ............... | H02K 16/00 310/156.35 |

* cited by examiner

*Primary Examiner* — Hanh Nguyen

(57) ABSTRACT

An electric motor apparatus that includes a disk with an increased mechanical advantage to the attached axle, with donut-shaped permanent magnets, windings, a fulcrum (A.K.A. axle), bearings, a commutator, and a single bearing conductor that replaces the brushes. The center axis consists of the windings and spools with the axis of the windings placed coradial in orbit around the fulcrum of a disk. The donut-shaped permanent magnets are cut with a slot to allow passage of the disk, spools, and windings. When windings of magnet wire are inserted with windings around the spools such that the center points of the faces of the spools are concentric to the same radius of the disk and pass through the center of a donut-shaped permanent magnet, and the windings are electrified with the correct polarity, the windings are repulsed magnetically in the direction of rotation of the orbit around the fulcrum (A.K.A. axle) causing the disk and axle to rotate. Upon completion of the fractional rotation, the original set of windings is deenergized and another set of windings is energized further rotating the disk and axle.

2 Claims, 22 Drawing Sheets

SIDE VIEW

Figure 1:
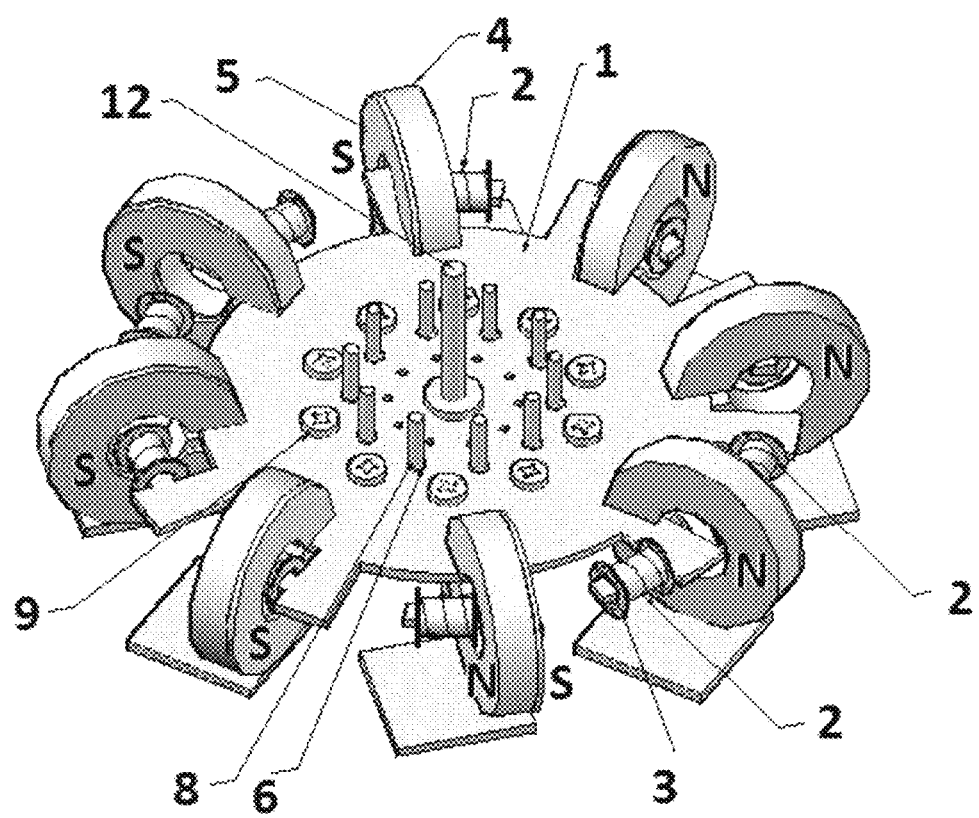

ORTHOGRAPHIC VIEW 8,10,17
COMBINE
TO MAKE
21

$$MA = \frac{dp}{da}$$

MA = Mechanical Advantage
MA = dp / da
da = axle diameter
dp = pulley diameter

PULLEY ELECTRIC MOTOR

BACKGROUND

1. Field of the Invention

PULLEY ELECTRIC MOTOR is in the field of electric motors. This is a redesigned electric motor to operate with a more efficient use of electricity. Most machines and other components have an electric motor to drive them. By increasing the efficiency of electric motors, energy consumption can be reduced.

2. Description of Prior Art

With the existing electric motor technology, the face of the windings are adjacent and parallel to the donut-shaped permanent magnet using the practice of lateral magnetic repulsion where the face of the winding slides on a plane parallel to the face of the magnet, with the strongest electromagnetic force pushing towards the axle, thereby wasting some of the magnetic force. By changing the orientation of the windings to the axle and mounting them on a disk, and having the face of the windings repulse from the magnetic field on a plane almost perpendicular to the face of the permanent magnet in the direction of the rotation of the axle with a mechanical advantage of the diameter of the disk applying torque to the axle, the rotational force is greatly increased.

Other disk style motors use small solid permanent magnets, or the cross section of donut-shaped permanent magnets to repulse the windings, which uses only a small portion of the magnetic field. The PULLEY ELECTRIC MOTOR, by going through the centers of stationary donut-shaped permanent magnets, increases surface area of the magnetic field.

With the existing electric motor technology, brushes are used which electrify the windings too long and increase friction. These have been replaced with a sealed bearing conductor.

With the windings of a traditional electric motor tightly packed into a small space and electrified longer than required, excessive heat builds up inside the electric motor requiring the inclusion of a fan blade to keep the motor from overheating.

As the windings in the PULLEY ELECTRIC MOTOR are close to the outside perimeter of the disk, the air flow around the windings is increased, along with a shorter electrified duration, making the use of a fan blade to cool the windings redundant and unnecessary.

SUMMARY

The objective of the PULLEY ELECTRIC MOTOR is to include a disk to take advantage of the mechanical advantage of a pulley to an axle. With the pulley being of a larger diameter than the axle and attached concentrically to the axle, the pulley has greater leverage to the axle. Force that is applied to the pulley instead of the axle has greater torque to the axle than if the force was applied to the axle directly. By attaching the windings and spools near the outside diameter of a disk which is larger in comparison to the axle, when the windings are energized with electricity, they are repulsed magnetically from the permanent magnet with greater torque to the axle than if the windings were close to the axle. As the windings in the PULLEY ELECTRIC MOTOR are close to the outside perimeter of the disk, the air flow around the windings is increased, along with a shorter electrified duration, making the use of a fan blade redundant and unnecessary.

Another objective of the PULLEY ELECTRIC MOTOR is to modify the repulsion of the windings and spools directionally. Instead of using magnetic force to slide the face of the windings and spools across a plane that is parallel to the face of a permanent magnet, the PULLEY ELECTRIC MOTOR uses magnetic force to move the face of the windings on a plane almost perpendicular to the face of the permanent magnet. By changing the motion to use the magnetic force to where it is strongest, the force applied is more efficient.

Another objective of the PULLEY ELECTRIC MOTOR is to modify the repulsion of the windings and spools to pass through the center of donut-shaped permanent magnets. Other disk style motors use small solid permanent magnets, or the cross section of donut-shaped permanent magnets to repulse the windings, which uses only a small portion of the magnetic field. The PULLEY ELECTRIC MOTOR, by going through the centers of stationary donut-shaped permanent magnets, increases surface area of the magnetic field being used for repulsion.

Another objective of the PULLEY ELECTRIC MOTOR is to eliminate the traditional use of brushes, which electrify the windings too long and increase friction. Carbon brushes have been replaced with a sealed bearing conductor and grounding the rigid metallic frame with one lead of the electrical circuit. With the windings of the PULLEY ELECTRIC MOTOR electrified shorter than other related art, less heat builds up inside the electric motor no longer requiring the inclusion of a fan blade to keep the motor from overheating.

Another advantage of the PULLEY ELECTRIC MOTOR is a reduction of size limitations. The diameter of the disk and spools is only limited by cost of the materials. With the center points of the faces of the windings concentric to the same diameter of the axle, the magnetic repulsion is in the direction of rotation around the axle. By changing the direction to use the magnetic force where it is strongest, the force applied is more efficient.

DETAILED DESCRIPTIONS

DISK 1: Specifically cut and shaped to hold the axis of the windings 2 coradial to an orbit around the axle 12. As the diameter of the disk 1 increases, the mechanical advantage of a pulley increases. The number of tabs 19 for windings 2 increases when the diameter increases.

WINDINGS 2: Magnet wire wrapped around a spool 3.

SPOOLS 3: Cases for easy wrapping of the windings 2. The spool 3 and windings 2 must have a smaller diameter than the inside diameters of the donut-shaped permanent magnets 4, with enough clearance space so that the spools 3 can pass through the donut-shaped permanent magnets 4 while in the orbit of the disk 1.

DONUT-SHAPED PERMANENT MAGNETS 4: Donut-shaped permanent magnets 4, with a slot through the outside diameter and the inside diameter, large enough for the passage of the disk 1, spools 3, windings 2, and conductors for the electrical circuits, with some additional clearance space to prevent contact.

MAGNET HOLDER 5: A ferrous piece of metal formed into a right angle, with a shape on one surface similar to the flat surface on the donut-shaped permanent magnets 4. This allows the attachment and adjustment of the permanent magnet. The other surface has holes to allow it to be bolted to the sheet metal base. The magnet holders, as well as the donut-shaped permanent magnets 4, are placed equidistant apart from each other in orbit around the axle 12 in such a way that the disk 1, spools 3 and windings 2 will pass through the donut-shaped permanent magnets 4 and magnet holders 5 while in orbit around the axle 12 without the disk 1, spools 3 and windings 2 making contact with the donut-shaped permanent magnets 4 or magnet holders 5.

NON-CONDUCTIVE SLEEVE 6: An insert for the disk 1 to allow the attachment of brass machine screws 8, brass machine nuts 10, without making direct electrical contact between the brass machine screws 8, brass machine nuts 10, and the disk 1.

NON-CONDUCTIVE WASHER 7: Allows the attachment of brass machine screws 8 and brass machine nuts 10 without making direct electrical contact between the brass machine screws 8, brass machine nuts 10, and the disk 1.

BRASS MACHINE SCREW 8: Allows for the passage of electricity and connects the conductors to the star-shaped electrical distribution units 11.

SELF-TAPPING SCREW 9: Driven into the disk 1 with rotational symmetry around the axle 12, allowing for the attachment of conductors to make electrical contact with disk 1.

BRASS MACHINE NUT 10: Allows for the locking in position of the brass machine screws 8.

STAR-SHAPED ELECTRICAL DISTRIBUTION UNIT 11: Brass sheet metal that allows for the connection of the commutator 20 leads to the brass machine screws 8.

AXLE 12:(A.K.A. FULCRUM): Secures the disk 1, allows for its rotation, also transfers torque to accessory components.

BEARING HOLDER 13: This secures the brass bearings 14 in place.

BRASS BEARING 14: Allows for the rotation of the axle 12 while holding the axle 12 in place.

WIRE HOLDER 15: Constructed of non-conductive p.v.c. pipe along with fiberglass resin which provides the structure for the wire conductors 16, allowing for the building of the commutator 20 by securing the wire conductors 16 in position. The wire holder 15 also attaches to the axle 12, holding the commutator 20 in orbit around the axle 12 without making direct electrical contact to the axle 12.

WIRE CONDUCTORS 16: Bent into a 3-dimensional shape to form a commutator 20, allowing for the passage of electricity from the bearing switch 21 to the star-shaped electrical distribution units 11.

STEEL BEARING 17: Rotates around the outside of the commutator 20, allowing for the passage of electricity from the commutator 20 to the self-tapping screws 9, then to the disk 1, and the rigid metallic frame 23.

DIODE 18: Prevents electrical backflow saturation of the windings 2.

TAB 19: The structures of disk 1 where the spools 3 and windings 2 are installed and held in place.

COMMUTATOR 20: A rotating switch where both the wire holder 15 and the wire conductors 16 combine to make the commutator 20.

BEARING CONDUCTOR 21: The combination of the single bearing 17, a machine screw 8 and brass machine nuts 10, to form a rotating bearing conductor 21.

NON-CONDUCTIVE LID FRAME 22: A flat piece of rigid non-conductive material, preferably made of plastic, with a hole to allow the passage of the axle 12 without contact and that the bearing holder 13 attaches to, and the bearing conductor 21 attaches to, holding them in correct placement without allowing an electrical current to pass through to the motor ground.

RIGID METALLIC FRAME 23: Metal formed into the shape of a box with a hole to allow the passage of the axle 12 without contact, and that the bearing holder 13 attaches to, securing correct placement of the brass bearings 14 around the axle 12, and acting as an electrical ground for the motor.

FIGURES

FIG. 1: Basic assembly of the PULLEY ELECTRIC MOTOR, the donut-shaped permanent magnets 4, with the magnetic poles labeled N for North and S for South, are held stationary by the magnet holders 5 with static magnetic fields, as well as the positioning of disk 1 with the windings 2 relative to the axle 12. When the windings 2 are electrified with the correct polarity, the electromagnetic field repels against the static magnetic field of the donut-shaped permanent magnets 4 rotating the disk 1. The spools 3 and windings 2 are attached to the disk 1 near the outer diameter, with the axis of the spools 3 and windings 2 parallel to the orbit around the axle 12 a.k.a. fulcrum. The means for supplying electrical current is a power source connected to the windings. When energized, this applies torque to the disk 1 which is transition press fit to the attached axle 12.

Figure 2:
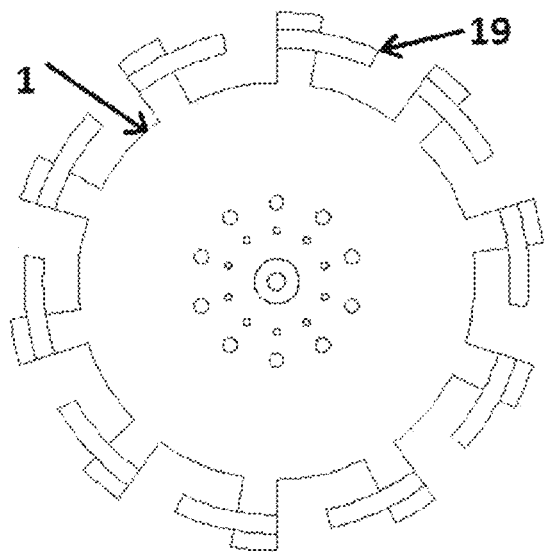

FIG. 2: The shape of the disk 1, with the tabs 19 for the spools 3 and windings 2 (FIG. 3) having rotational symmetry.

Figure 3:
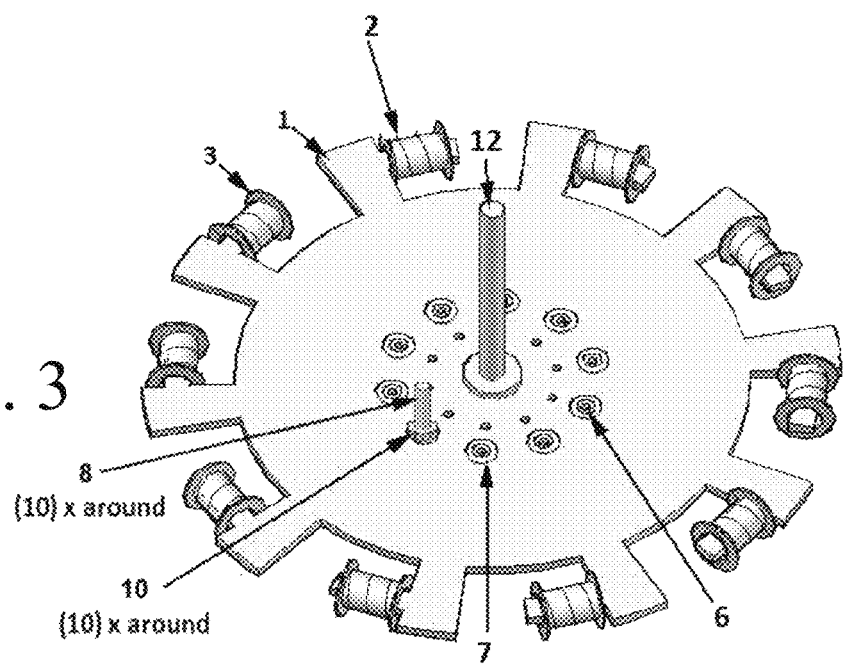

FIG. 3: The disk 1 with spools 3, windings 2, and the axle 12 with the non-conductive sleeves 6 and non-conductive washers 7 that electrically isolate the brass machine screws 8 from the disk 1.

Figure 4:
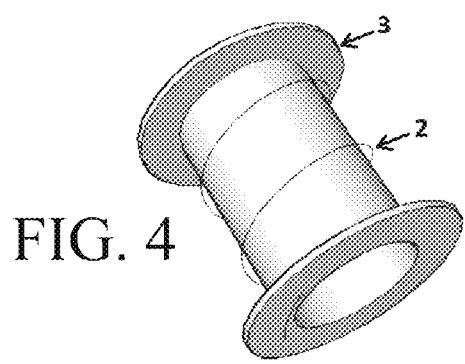

FIG. 4: Windings 2 around a spool 3 for easy winding of the magnet wire and installation on the tabs 19 of the disk 1.

Figure 5:
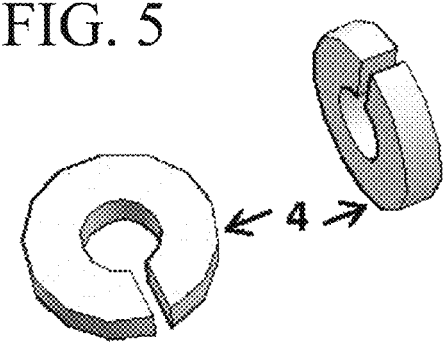

FIG. 5: Donut-shaped permanent magnets 4, with a slot cut to allow for passage of the disk 1, the spools 3, and windings 2.

Figure 6:
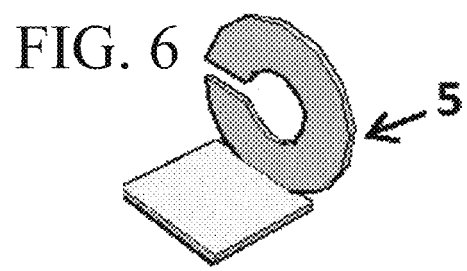

FIG. 6: Magnet holder 5, with a slot cut to allow for passage of the disk 1, the spools 3, the windings 2, and conductors.

Figure 7:
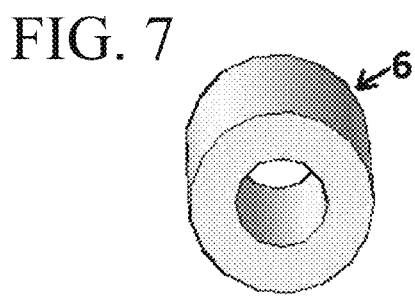

FIG. 7: Non-conductive sleeve 6.

Figure 8:
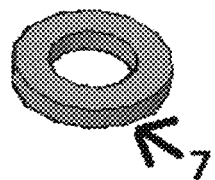

FIG. 8: Non-conductive washer 7.

Figure 9:
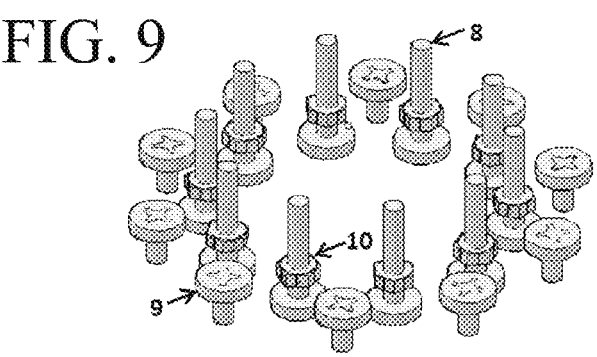

FIG. 9: Brass machine screws 8, brass machine nuts 10, and self-tapping screws 9 in position, without the disk 1.

Figure 10:
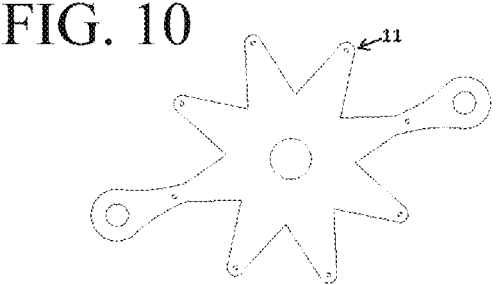

FIG. 10: A single star-shaped electrical distribution unit 11.

Figure 11:
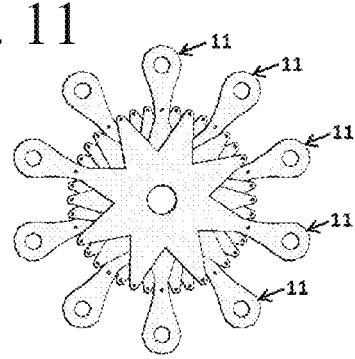

FIG. 11: Star-shaped electrical distribution units 11 in a top view position, relative to each other.

Figure 12:
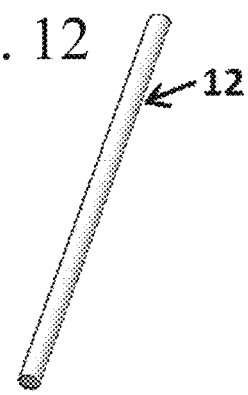

FIG. 12: The axle 12.

Figure 13:
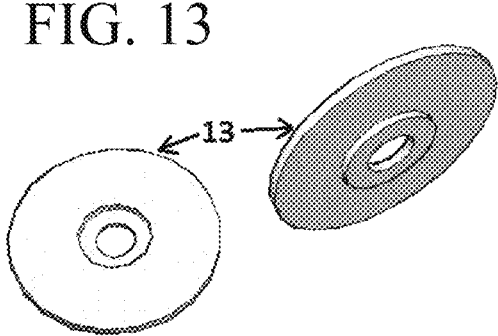

FIG. 13: Bearing holders 13.

Figure 14:
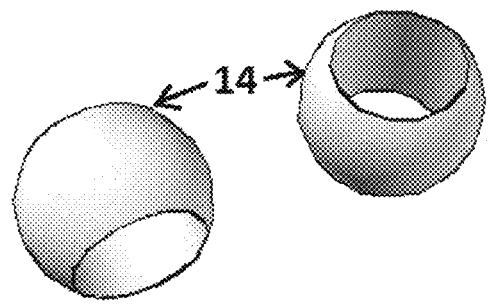

FIG. 14: Brass bearings 14.

Figure 15:
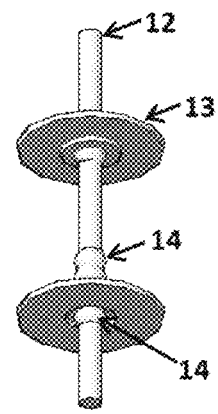

FIG. 15: Illustrates how the axle 12 is fitted with the brass bearings 14 and bearing holders 13.

Figure 16:
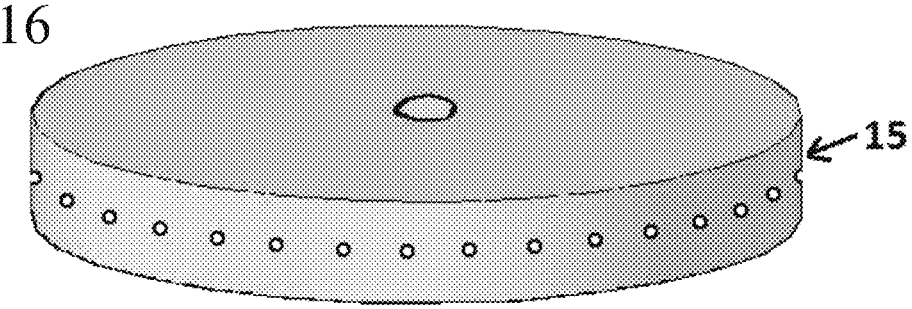

FIG. 16: Wire holder 15.

Figure 17:
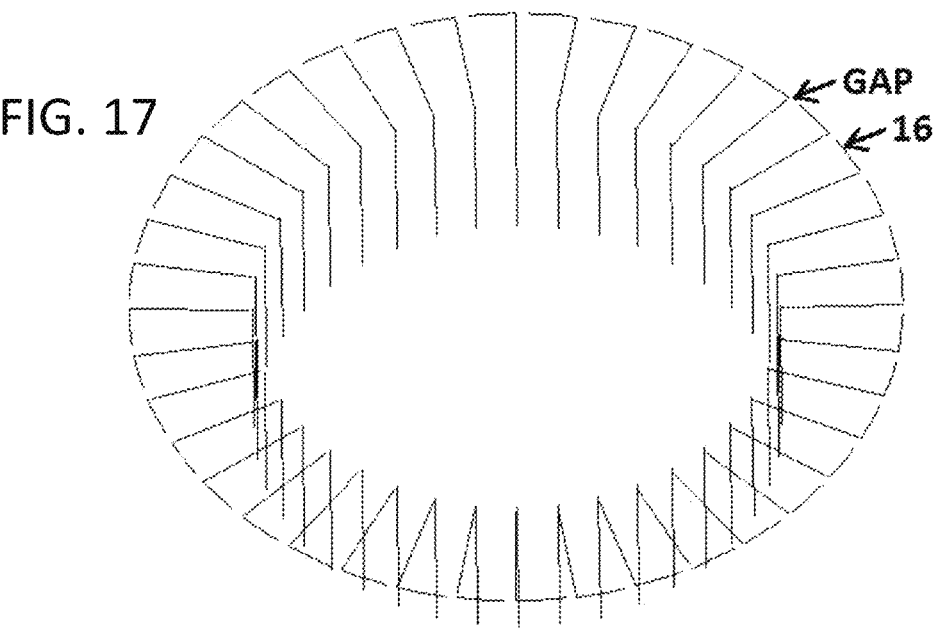

FIG. 17: A view of the wire conductors 16 to form 3-dimensional circuits.

Figure 18:
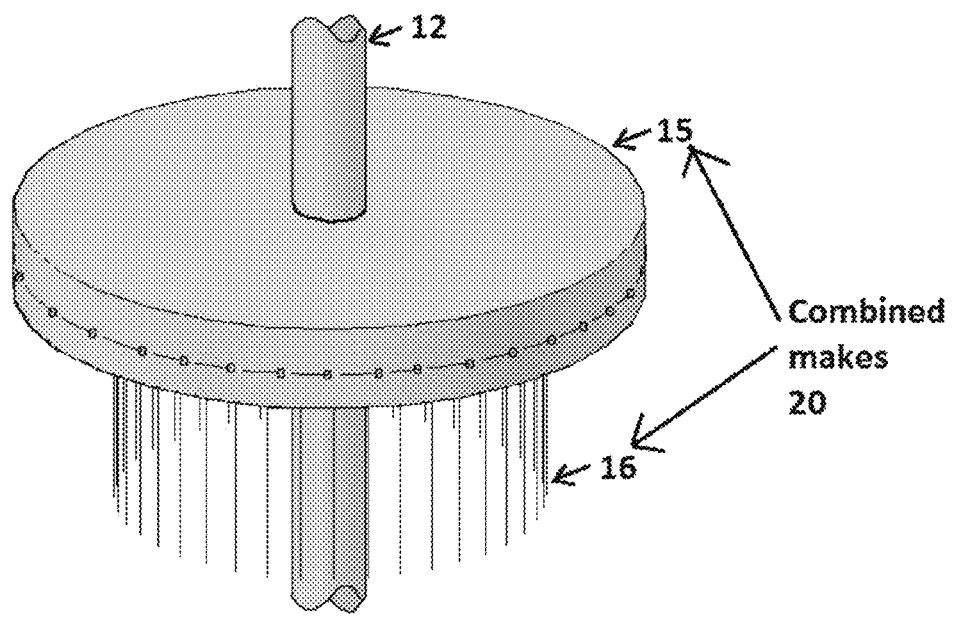

FIG. 18: The assembly of the axle 12, non-conductive wire holder 15, and wire conductors 16 in 3-dimensional circuits form the commutator 20.

Figure 19:
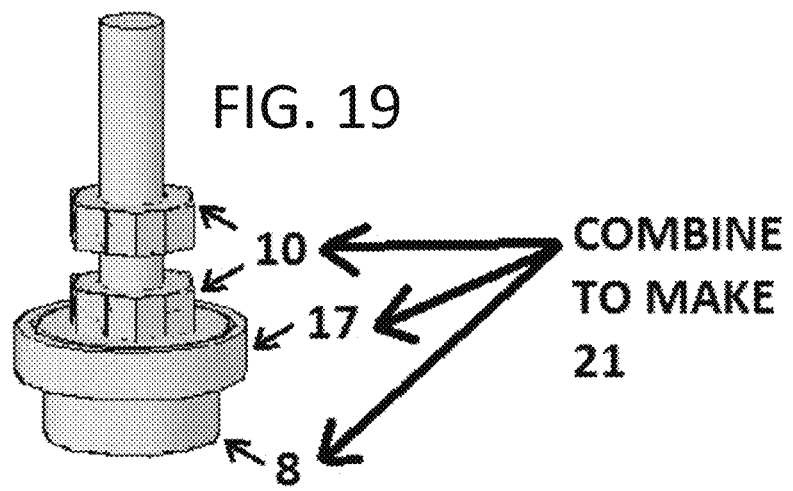

FIG. 19: Bearing conductor 21 assembly, consisting of a brass machine screw 8, two brass machine nuts 10, and a steel bearing 17.

Figure 20:
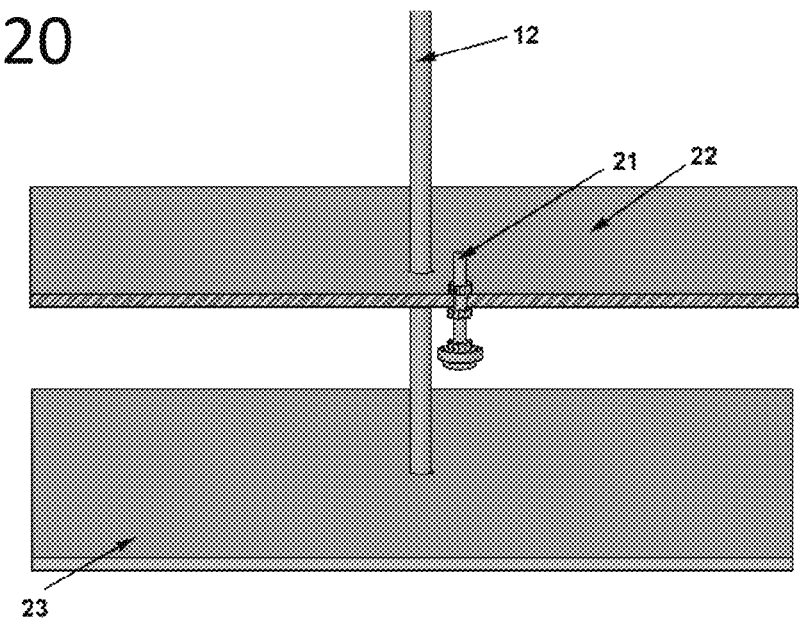

FIG. 20: A cutaway view of the non-conductive lid frame 22 with the axle 12 protruding through it without physical contact and the bearing conductor 21 attached in place with electrical isolation from the rigid metallic frame 23 ground.

Figure 21:
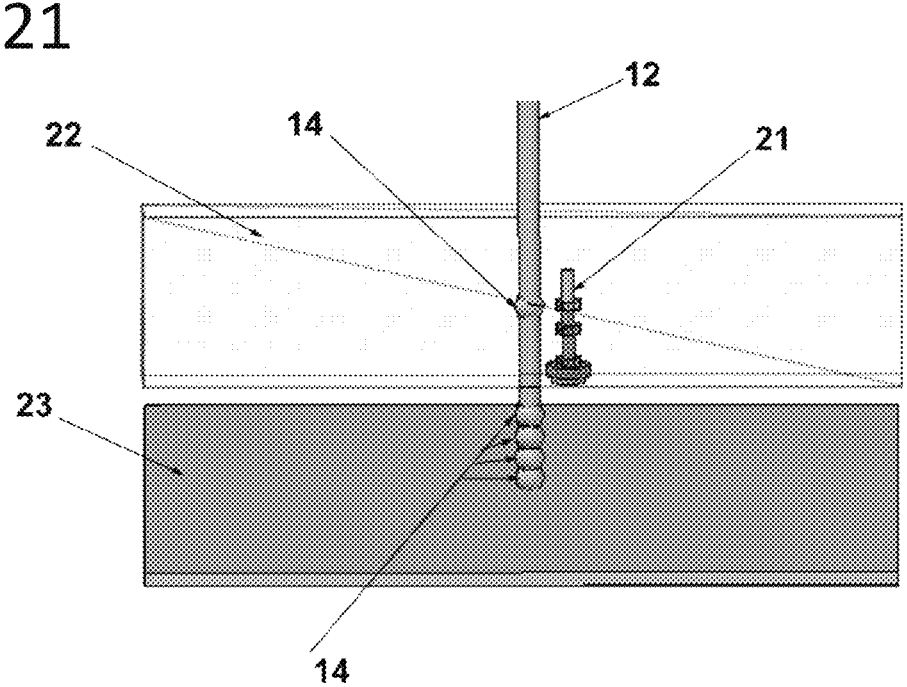

FIG. 21: A transparent view of the non-conductive lid frame 22 with the axle 12 protruding through it and the attached bearing conductor 21 in place with no electrical connection to the frame being made between the bearing conductor 21 and the axle 12. The rigid metallic frame 23 is partially shown in position along with the brass bearings 14 slid into position around the axle 12.

Figure 22:
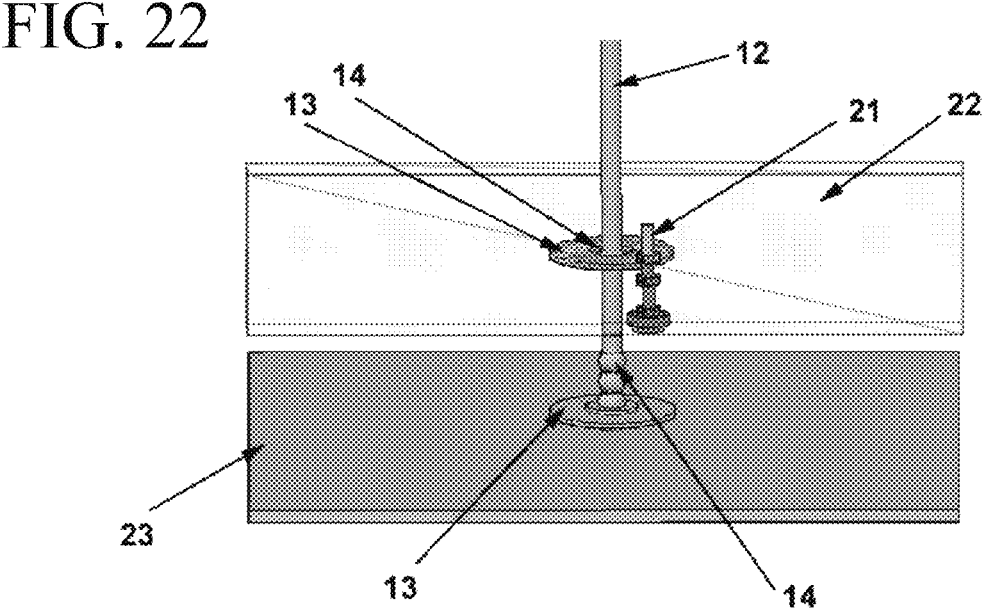

FIG. 22: Shows the bearing holders 13 attached to the non-conductive lid frame 22 and the rigid metallic frame 23 securing the brass bearings 14 into position which then hold the axle 12 in position while allowing the axle 12 to rotate freely.

Figure 23:
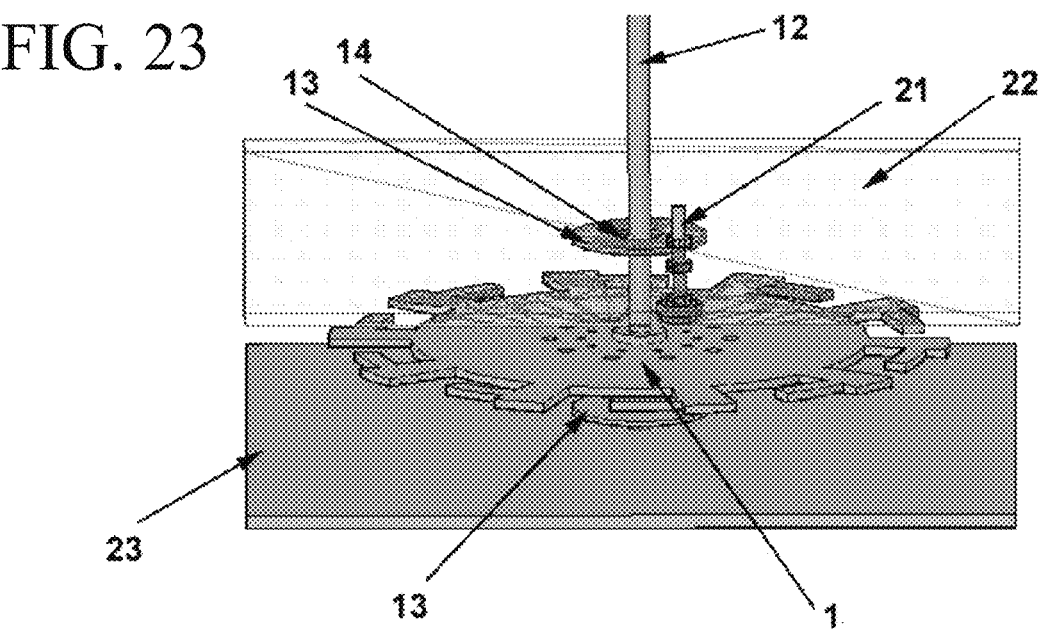

FIG. 23: Shows the disk 1 attached to the axle 12 with a transition press fit producing potential mechanical advantage to the axle 12 as the disk 1 has force applied to it causing rotation.

Figure 24:
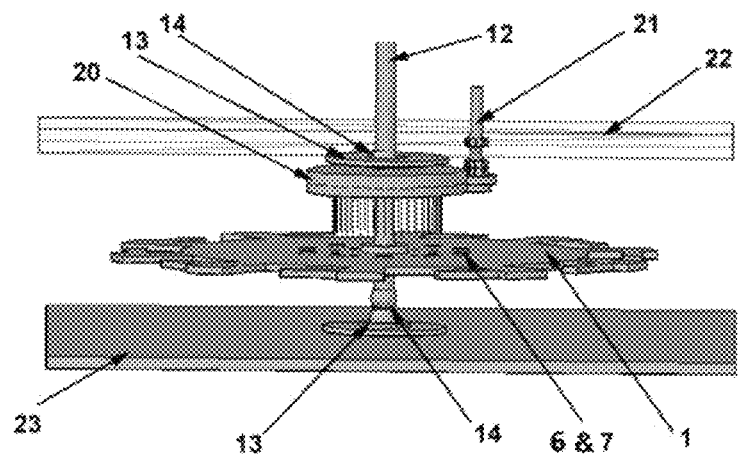

FIG. 24: Illustrates transition press fit of the commutator 20 onto the axle 12 to insure that the commutator 20 which is a combination of wire holder 15 and wire conductors 16, rotates in unison with the axle 12. Also illustrated is the non-conductive washers 7, as well as location of the non-conductive sleeves 6 (FIG. 3) which electrically isolate the brass machine screws 8 (FIG. 3) from the disk 1.

Figure 25:
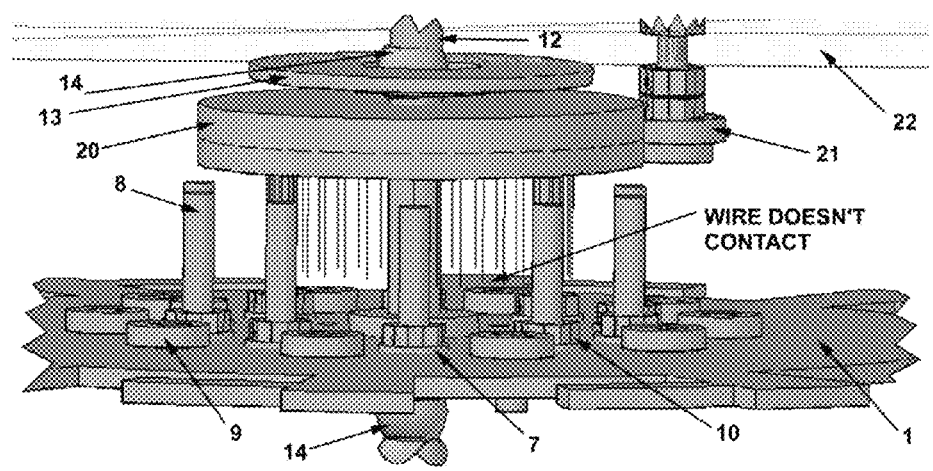

FIG. 25: Illustrates the electrical contact between the commutator 20 and the bearing conductor 21. The brass machine nuts 10 are shown securing the brass machine screws 8 to the disk 1 but the brass machine screws 8 and brass machine nuts 10 remain without direct electrical contact with the disk 1. Also shown is the physical electrical connection between the self-tapping screws 9 and the disk 1 with the wire conductors 16 from the commutator 20 not making contact with the disk 1, or the self-tapping screws 9.

Figure 26:
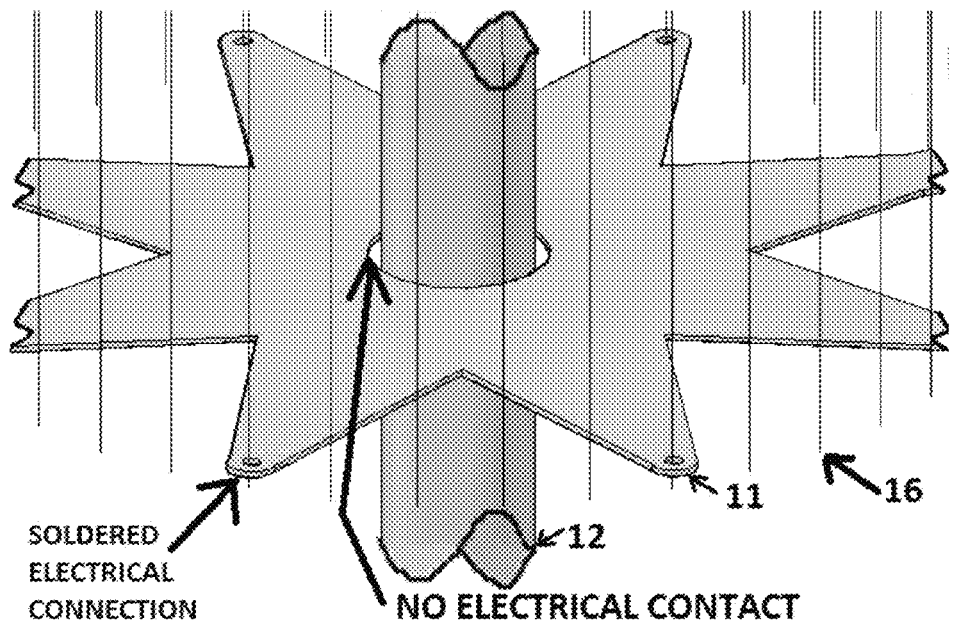

FIG. 26: Star-shaped electrical distribution unit 11, shown in relation to the wire conductors 16 which would then be soldered together at points indicated while no direct electrical contact with the axle 12 is made.

Figure 27:
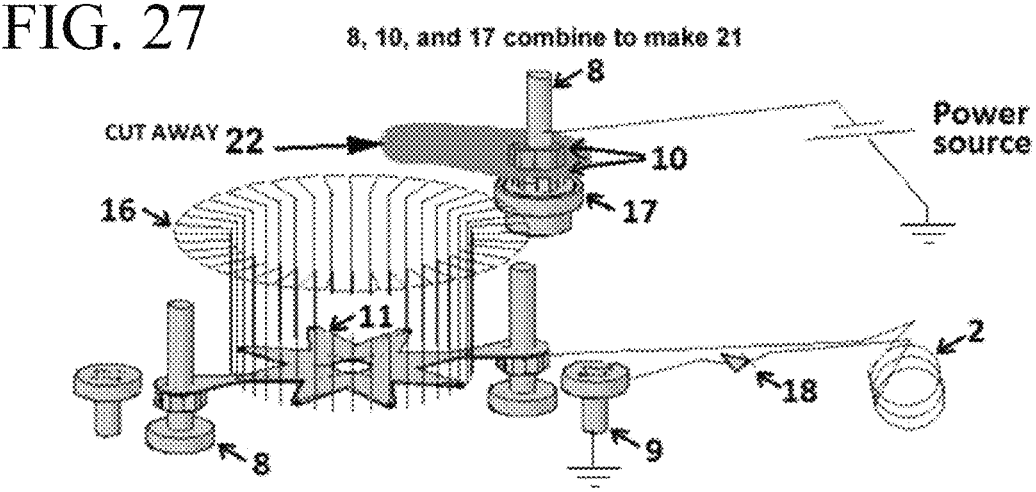

FIG. 27: Illustrates a schematic view of the PULLEY ELECTRIC MOTOR with the non-conductive lid frame 22 cut away to illustrate the mechanical fastening of the bearing conductor 21 in a fixed position while an electrical contact is made with the wire conductors 16 while the other components are able to rotate. One of the leads from the windings 2 is electrically connected to the single star-shaped electrical distribution unit 11 which in turn is electrically connected to the wire conductors 16. The other lead from the windings 2 is electrically connected to the self-tapping screws 9 acting as a ground by being physically and electrically connected to the disk 1 (FIG. 32) which is the electrical ground.

Figure 28:
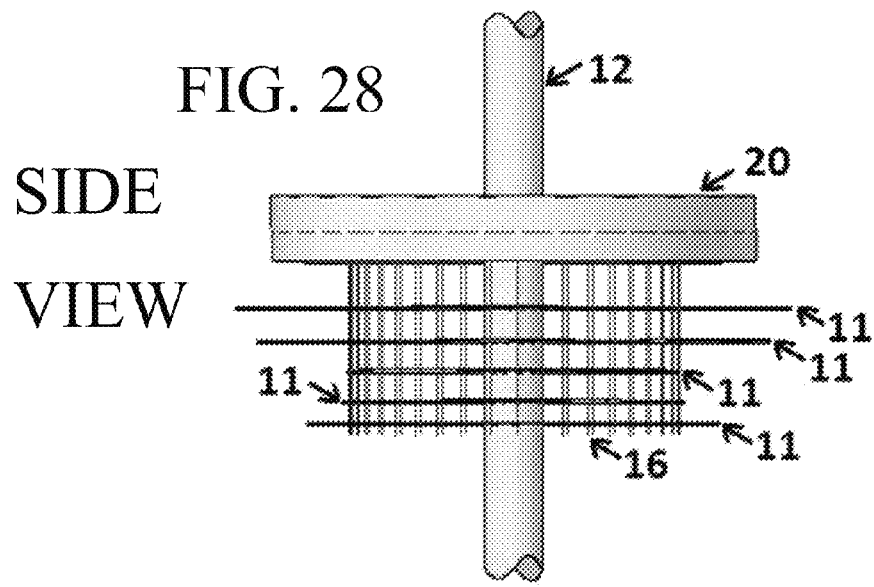

FIG. 28: Illustrates a side view of the commutator 20 electrically isolated by fiberglass resin, yet physically connected to the axle 12. Also illustrates the physical and electrical separation of the single star-shaped electrical distribution units 11 from each other with the individual wire conductors 16 in the commutator 20 connected to a corresponding star-shaped electrical distribution unit 11 location.

Figure 29:
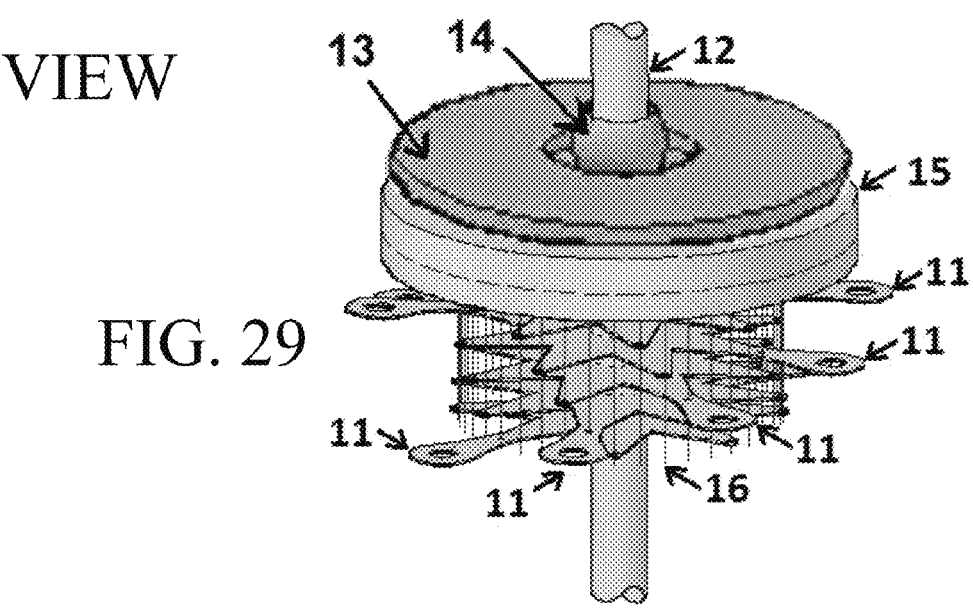

FIG. 29: Illustrates an orthographic view of the commutator 20 electrically isolated by fiberglass resin, yet physically connected to the axle 12. Also illustrates the physical and electrical separation of the single star-shaped electrical distribution units 11 from each other. The bearing holder 13 and brass bearing 14 are shown in relation to the commutator 20 and axle 12.

Figure 30:
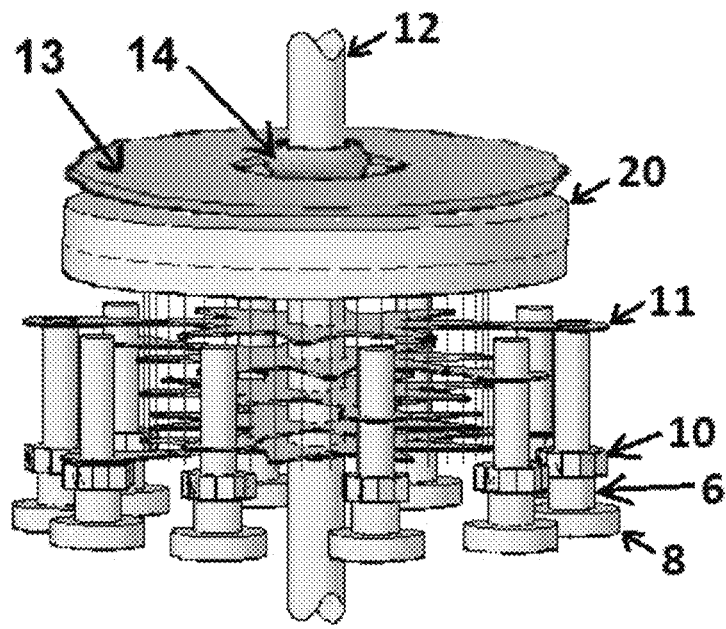

FIG. 30: Illustrates the inclusion of the brass machine screws 8, the non-conductive sleeves 6, and the brass machine nuts 10 which make both a physical and electrical connection to selected single star-shaped electrical distribution units 11 in relation to the axle 12, the bearing holder 13 and brass bearing 14.

Figure 31:
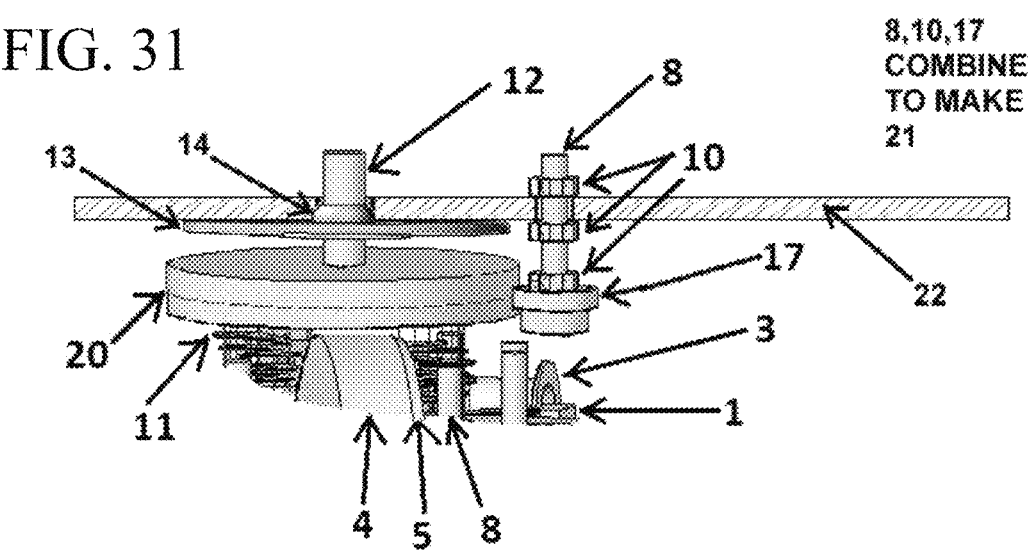

FIG. 31: Illustrates cutaway view to show the location of the non-conductive lid frame 22, holding the bearing conductor 21, the brass bearing 14, and bearing holder 13 while the axle 12 is allowed to rotate through the non-conductive lid frame 22. The commutator 20, star-shaped electrical distribution units 11, a donut-shaped permanent magnet 4, magnet holder 5, brass machine screw 8, spool 3, and disk 1 orthographically in position to one another.

Figure 32:
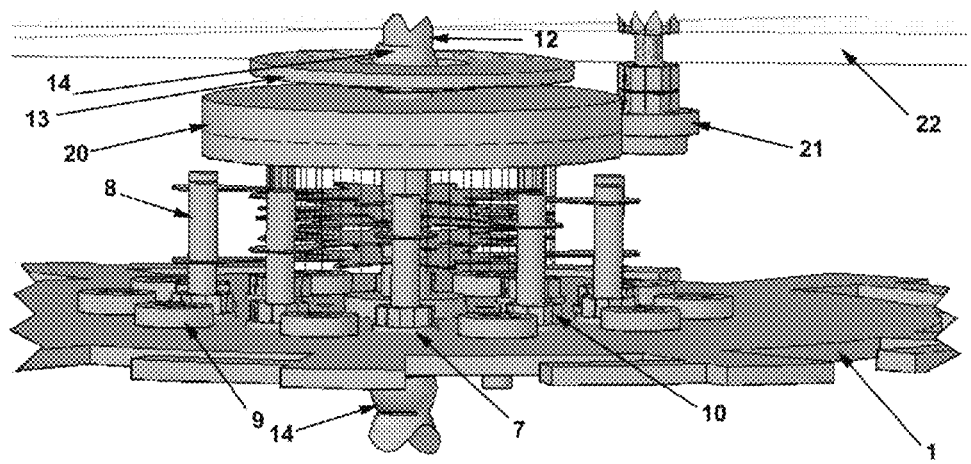

FIG. 32: Illustrates an orthographic view to show the location of the non-conductive lid frame 22, holding the bearing conductor 21, the brass bearings 14, and bearing holder 13 while the axle 12 is allowed to rotate through the non-conductive lid frame 22. The commutator 20, the star-shaped electrical distribution units 11, connected to the brass machine screws 8 which pass through the non-conductive washers 7 and non-conductive sleeves 6 (FIG. 3) held onto the disk 1 by means of the brass machine nuts 10 without making direct electrical connection to the disk 1. Also shown is the self-tapping screws 9 and disk 1 in position to each other, completing a ground connection.

Figure 33:
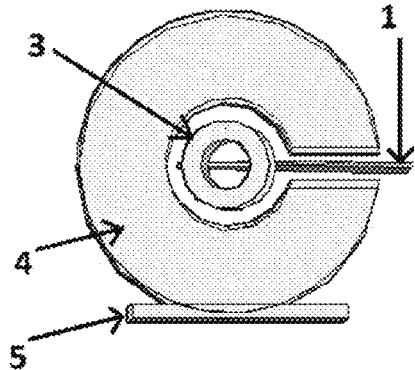

FIG. 33: Illustrates a side view of the magnet holder 5, donut-shaped permanent magnet 4, spool 3, and windings 2 (FIG. 4) with a cutaway view of the disk 1 to show how the donut-shaped permanent magnet 4 has a slot cut into it allowing for the rotary passage of the disk 1, spool 3, and windings 2 (FIG. 4), with the magnet holder 5 and donut-shaped permanent magnet 4 stationary.

Figure 34:
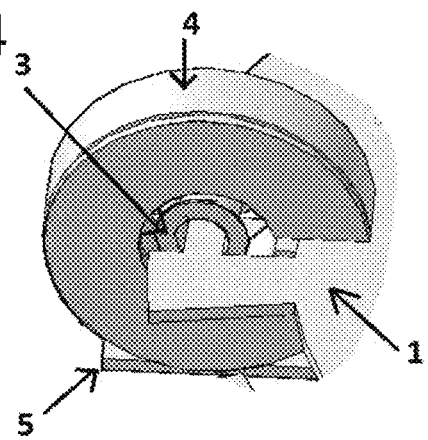

FIG. 34: Illustrates an orthographic view of the magnet holder 5, donut-shaped permanent magnet 4, spool 3, and windings 2 (FIG. 4) with a cutaway view of the disk 1 to show how the donut-shaped permanent magnet 4 has a slot cut into it allowing for the rotary passage of the disk 1, the spool 3, and windings 2 (FIG. 4), with the magnet holder 5 and donut-shaped permanent magnet 4 stationary.

Figure 35:
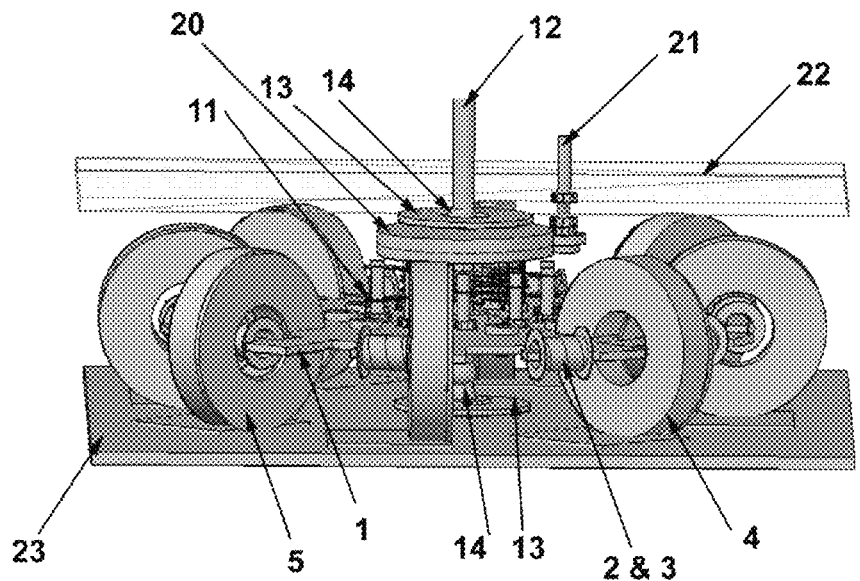

FIG. 35: Illustrates an orthographic view of the stationary components; non-conductive lid frame 22 with the attached conductor bearing 21 assembly, the rigid metallic frame 23, the attached magnet holders 5, the subsequently attached donut-shaped permanent magnets 4. The direct rotating components are the disk 1, and the axle 12. Physically connected to the disk 1 and the axle 12, and therefore rotate with the disk 1 and axle 12 are the windings 2, spool 3, axle 12, commutator 20, and the star-shaped electrical distribution units 11.

Figure 36:
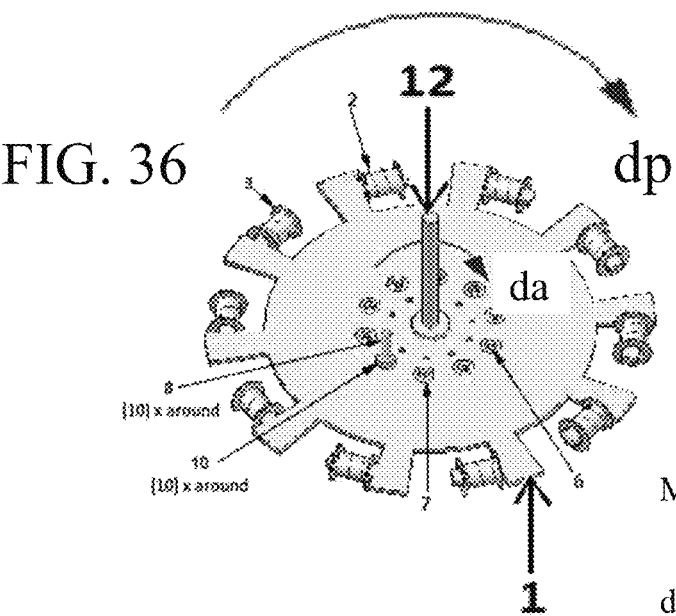

FIG. 36: Illustrates the laws of physics in regards to the mechanical advantage of a pulley. With a larger pulley (disk 1) diameter in comparison to the axle 12 diameter, the mechanical advantage or leverage to the axle 12, A.K.A. fulcrum is increased. Force that is applied to the outer edge of the pulley (disk 1) instead of the axle 12 has greater torque to the axle 12 than if the force was applied to the axle 12 directly. With the pulley (disk 1) being of a larger diameter than the axle 12 and attached concentrically to the axle 12, the pulley (disk 1) has greater leverage to the axle 12. Force that is applied to the pulley (disk 1) instead of the axle 12 has greater torque to the axle 12 than if the force was applied to the axle 12 directly.

Figure 37:
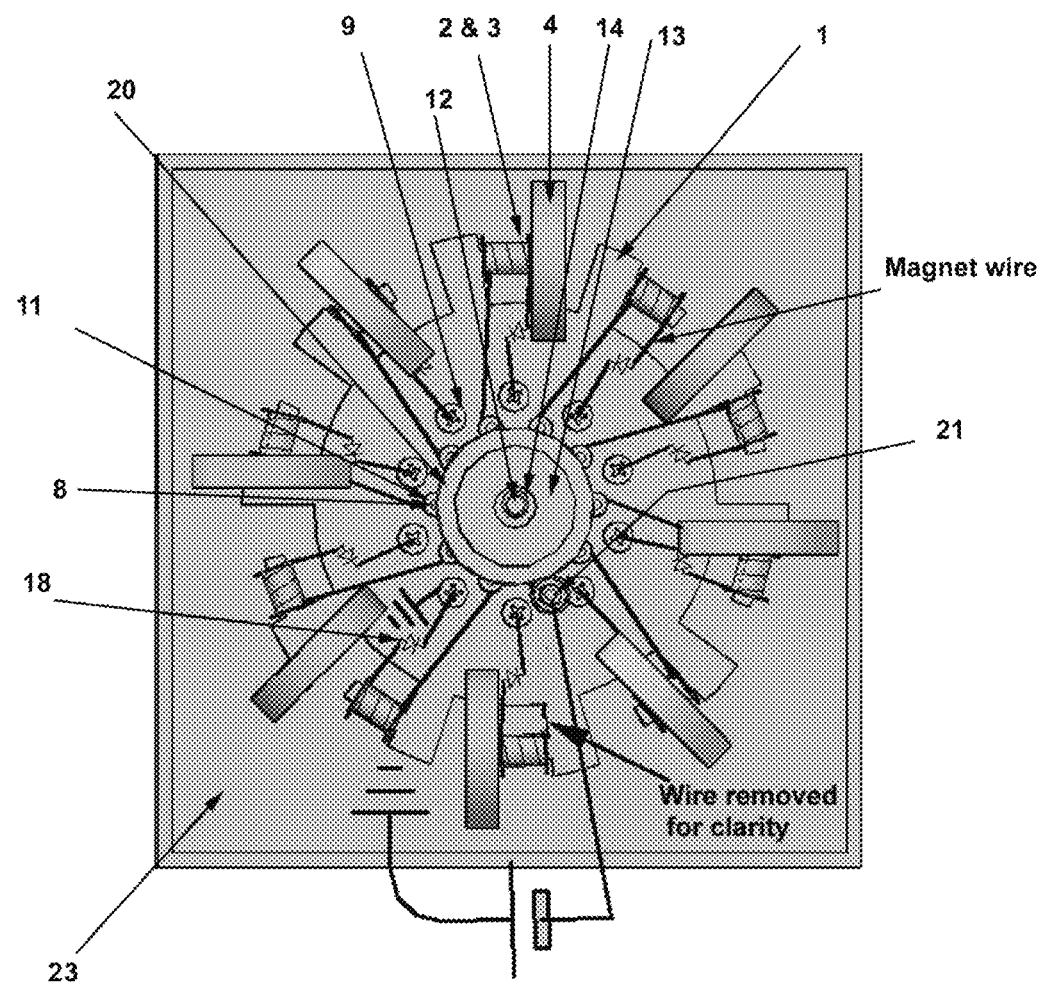

FIG. 37: Illustrates the rigid metallic frame 23 acting as a ground for the entire motor. The windings 2 are directly electrically connected through diodes 18 to the self-tapping screws 9, to the disk 1, to the axle 12, through the brass bearing 14 (FIG. 24), to the ground. With the other lead of the windings 2, which is not directly electrically connected to the disk 1, but is directly electrically connected to the star-shaped electrical distribution units 11, then to the brass machine screws 8, and continues to the commutator 20, to the bearing conductor 21, to other terminal of the power source. As the disk is repulsed to rotate by electromagnetic force and passes through the centers of donut-shaped permanent magnets 4, held in stationary position by the magnet holders 5 (FIG. 39) in corresponding position to the disk 1, the present circuit is deenergized and a new circuit is energized continuing the rotation of the disk 1, and axle 12.

Figure 38:
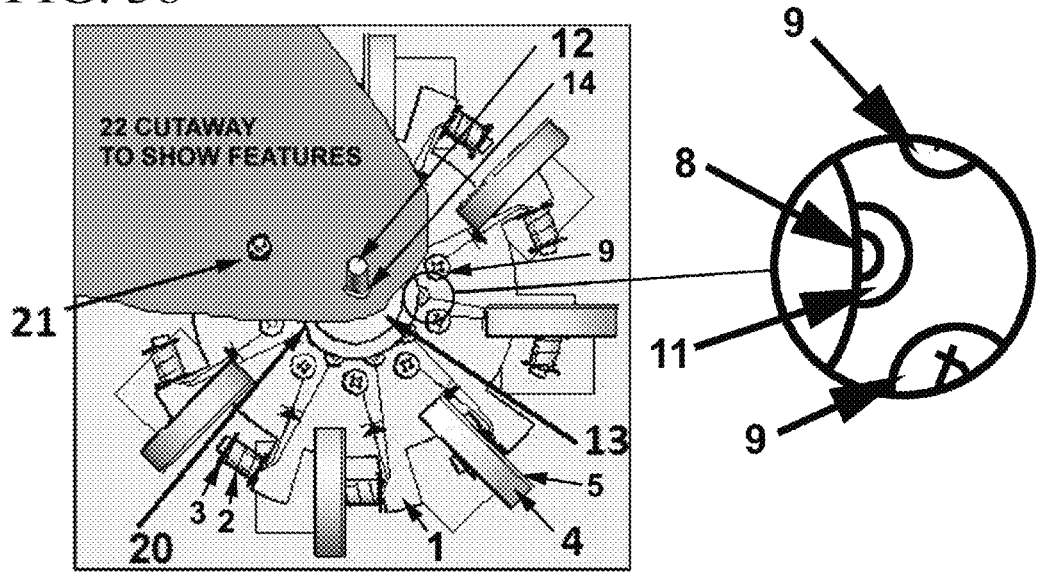

FIG. 38: Illustrates the top view of the PULLEY ELECTRIC MOTOR, with a cutaway view of the non-conductive lid frame 22 holding the bearing conductor 21 stationary while the axle 12 is able to rotate by means of the bearing holder 13, and brass bearing 14. The commutator 20 is connected to individual star-shaped electrical distribution units 11 that are in electrical contact with the machine screws 8 and yet electrically isolated from the other star-shaped electrical distribution units 11 and other the machine screws 8. Illustrated is the electrical connection between the self-tapping screws 9 and the disk 1 to the windings 2 and the star-shaped electrical distribution units 11. The donut-shaped permanent magnets 4 held in stationary position by the magnet holders 5 in corresponding positions to the disk 1.

Figure 39:
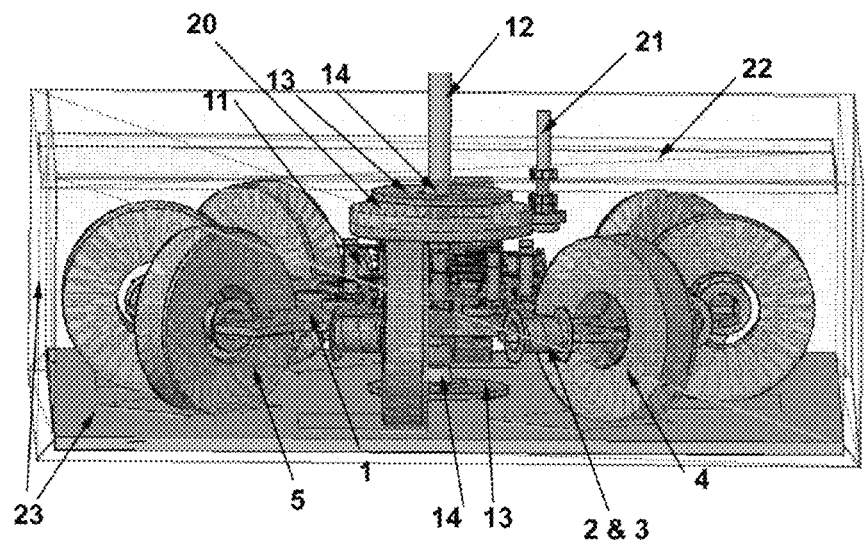

FIG. 39: Illustrates the rigid metallic frame 23 and the non-conductive lid frame 22 in a transparent state to demonstrate how the frame pieces surround all the components, with the bearing holders 13 attached, which secures the brass bearings 14, through which the axle 12 is held into position and allowed to rotate.

Figure 40:
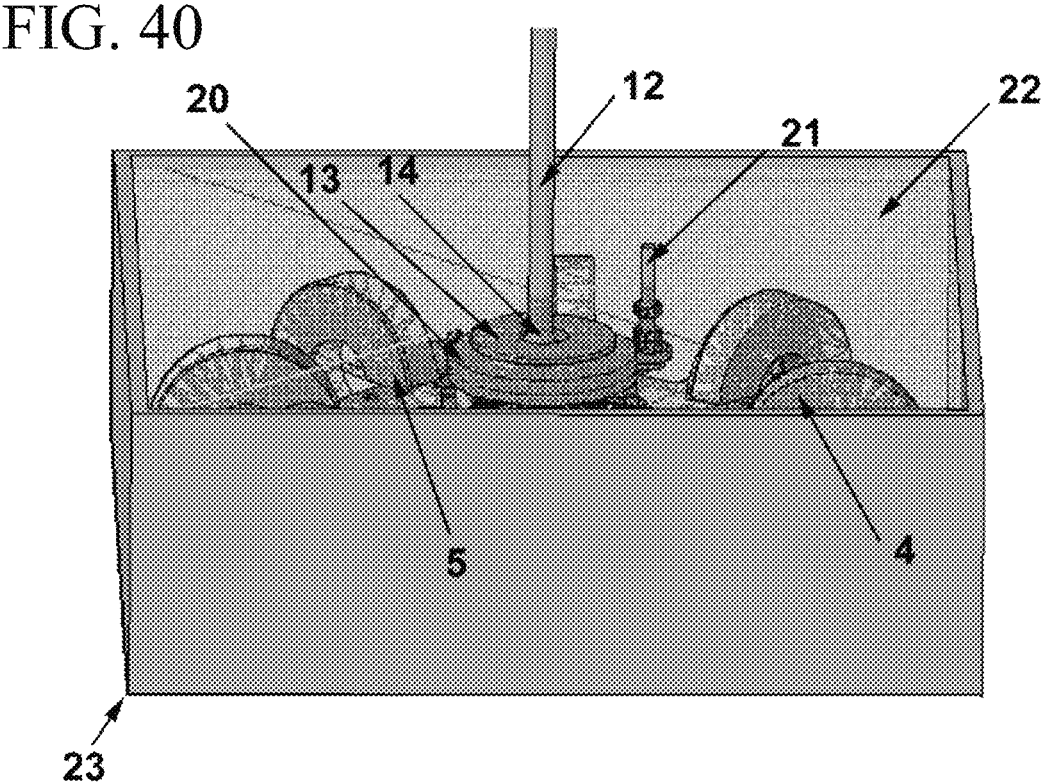

FIG. 40: Illustrates a transparent view of the non-conductive lid frame 22, a solid view of the rigid metallic frame 23 and the completely assembled PULLEY ELECTRIC MOTOR.

Figure 41:
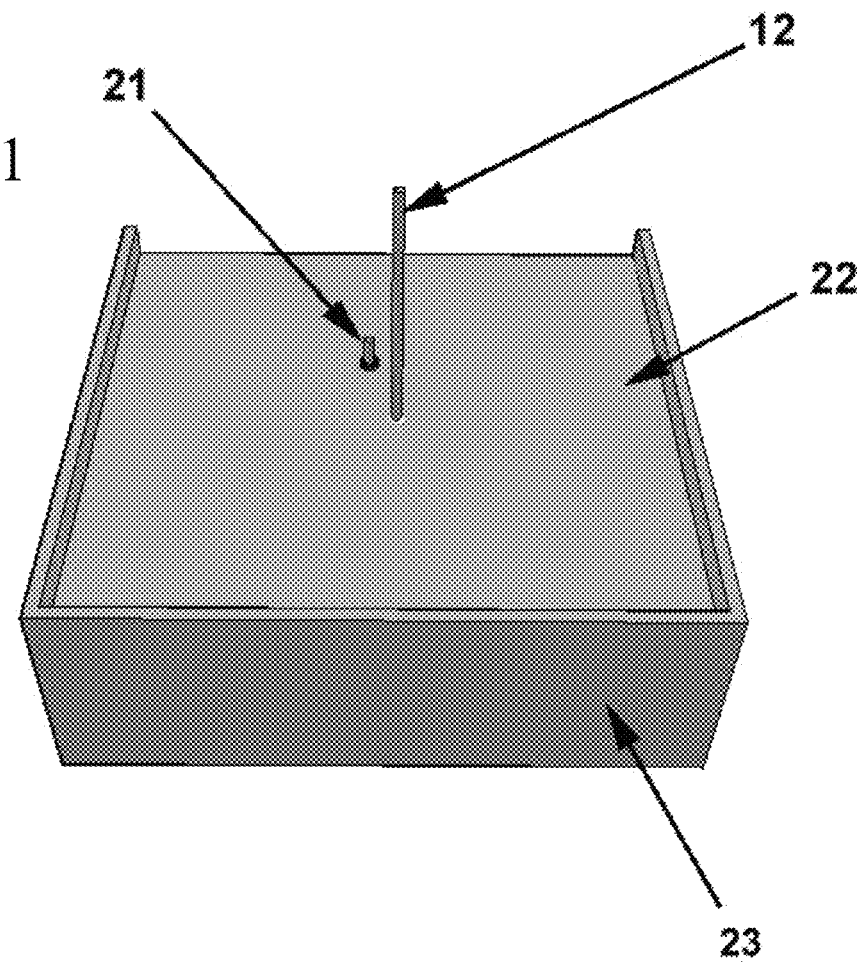

FIG. 41: Illustrates the non-conductive lid frame 22 in combination with the rigid metallic frame 23 with the attached bearing conductor 21. The axle 12 is protruding out the non-conductive lid frame 22, but the axle 12 is allowed to spin freely.

Figure 42:
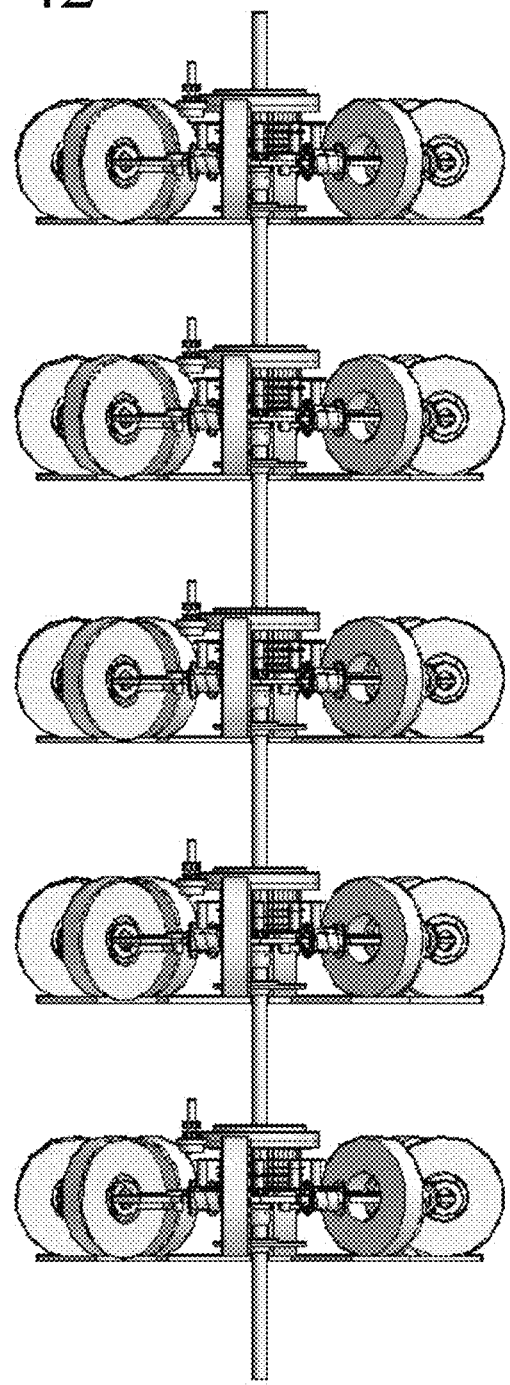

FIG. 42: Illustrates that torque increases by combining multiple complete PULLEY ELECTRIC MOTORS onto a single axle 12. This is one way to achieve more torque with the same voltage.

Figure 43:
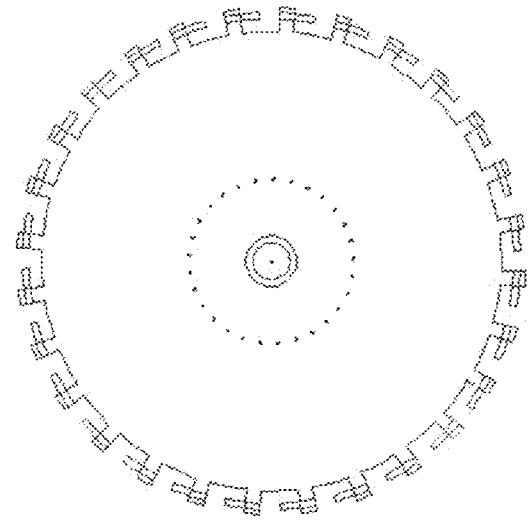

FIG. 43: Illustrates a larger diameter disk 1, with an increased mechanical advantage and more tabs 19 for windings 2, will increase torque to the axle 12.

Figure 44:
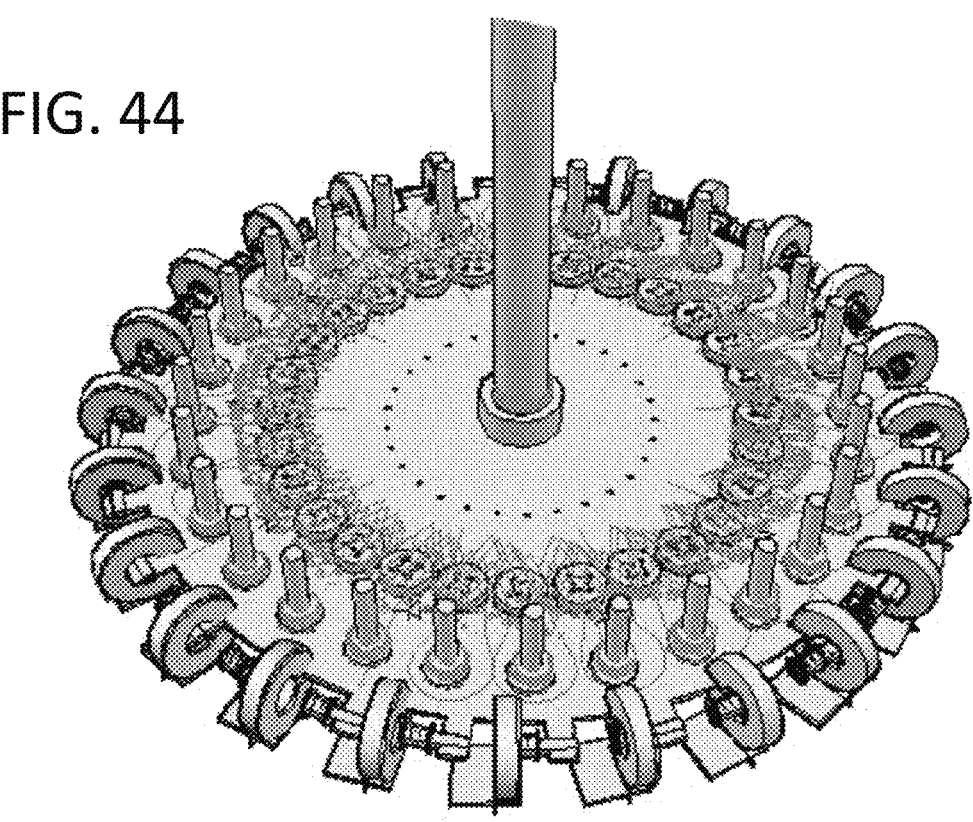

FIG. 44: Illustrates that a larger diameter disk 1 with an increased mechanical advantage, together with a larger quantity of spools 3, windings 2, star-shaped electrical distribution units 11, and donut-shaped permanent magnets 4, applies more mechanical advantage of a pulley to the axle 12. This will achieve more torque with the same voltage.

Figure 45:
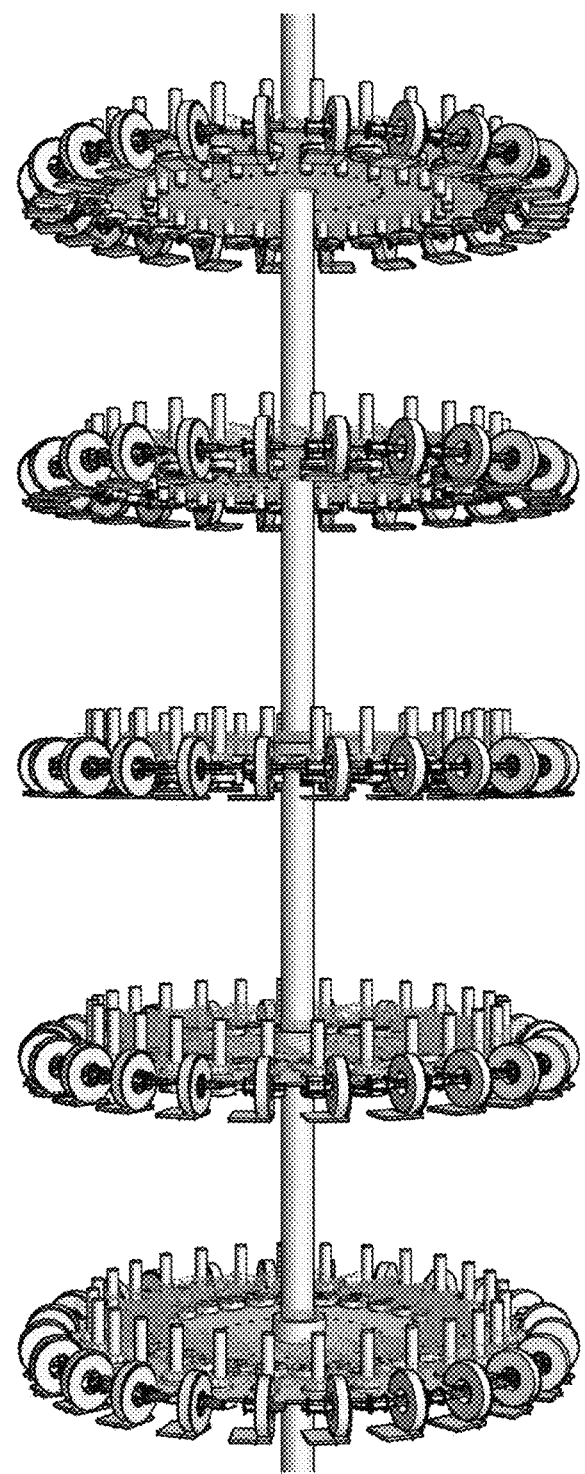

FIG. 45: Illustrates combining multiple complete PULLEY ELECTRIC MOTORS with a larger diameter disk 1 onto a single axle 12 to increase torque. This is another way to achieve more torque with the same voltage.

Figure 46:
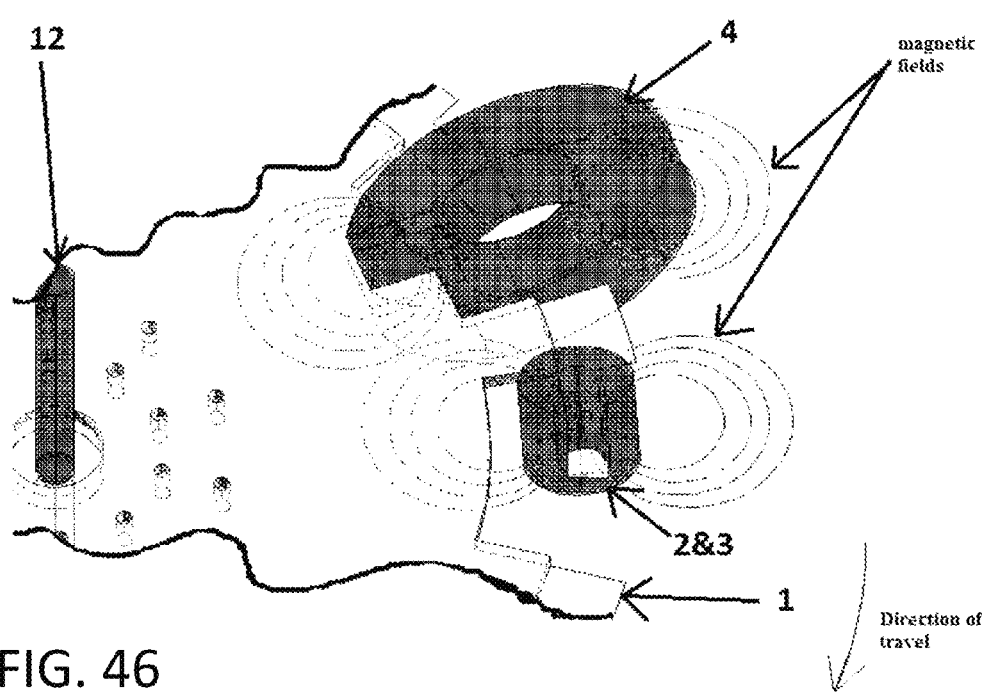

FIG. 46: Illustrates a cutaway view of the disk 1, with windings 2 around spools 3 that repulse magnetically from the face of the stationary donut-shaped permanent magnets 4, and the repulsion is in the direction of rotation around the axle 12. By changing the motion to use the magnetic force to where it is strongest, the force applied is more efficient.

PREFERRED EMBODIMENTS

1. The disk turned and milled out of a single piece of cast iron with the tabs as close together as possible with the spools milled directly into the disk.
2. The axle to be placed into a horizontal plane for safety.
3. The rigid metallic frame and non-conductive lid frame to be of enough mass to withstand a motor failure.

What is claimed:

1. A machine for the conversion of electric energy from a power source into rotating force commonly known as a motor comprising windings around spool that are attached to a disk near the outside diameter of the disk with slots cut through the centers of stationary donut-shaped permanent magnets allowing electromagnetic force to rotate the disk by the windings and spools, wherein both of the windings and spools pass through the center of donut shaped permanent magnets which implements the mechanical advantage of a pulley to the attached axle of the disk, force that is applied to the disk instead of the axle has greater torque to the axle than if the force was applied to the axle directly.

2. The machine in accordance to claim 1, wherein the windings around the spools repulse magnetically from the stationary donut-shaped permanent magnets in the direction of rotation around the axle.

\* \* \* \* \*